US012774169B2

(12) United States Patent
Hart, Jr.

(10) Patent No.: US 12,774,169 B2
(45) Date of Patent: Oct. 27, 2026

(54) HANGER BEARING ASSEMBLY FOR A SCREW CONVEYOR AND METHODS OF REPLACING AND RETROFITTING THE SAME

(71) Applicant: William F. Hart, Jr., Prospect, KY (US)

(72) Inventor: William F. Hart, Jr., Prospect, KY (US)

( * ) Notice: Subject to any disclaimer, the term of this patent is extended or adjusted under 35 U.S.C. 154(b) by 22 days.

(21) Appl. No.: 18/524,415

(22) Filed: Nov. 30, 2023

(65) Prior Publication Data

US 2025/0178843 A1 Jun. 5, 2025

(51) Int. Cl.
*B65G 33/32* (2006.01)

(52) U.S. Cl.
CPC .................................... *B65G 33/32* (2013.01)

(58) Field of Classification Search
None
See application file for complete search history.

(56) References Cited

U.S. PATENT DOCUMENTS 275,877 A 4/1883 Barnes
1,158,844 A 11/1915 Price
1,993,003 A 3/1935 Green et al.
2,279,201 A 4/1942 Kozak
2,424,810 A 7/1947 Escher
2,524,948 A 10/1950 Whitney
2,545,140 A 3/1951 Escher
2,864,657 A 12/1958 Davidson et al.
3,037,613 A 6/1962 Harmon
3,072,243 A * 1/1963 Davis .................... B65G 33/32 198/666
3,112,963 A 12/1963 Cardwell
3,144,125 A 8/1964 Medley
3,272,317 A * 9/1966 Kelly .................... B65G 33/32 198/666
3,351,395 A 11/1967 Stone
3,709,571 A 1/1973 Croisant et al.
3,820,860 A 6/1974 Stone
3,865,444 A 2/1975 Lavoie
4,025,131 A * 5/1977 Bergquist ................ F16C 35/00 384/428
4,077,508 A 3/1978 Pedersen
(Continued)

*Primary Examiner* — Kavel Singh
(74) *Attorney, Agent, or Firm* — Dentons Bingham Greenebaum LLP; James C. Eaves, Jr.; Natalie S. Beshock

(57) ABSTRACT

The present invention relates to a hanger bearing assembly used to support at least one end of a screw section in a multi-screw section screw conveyor, a method of replacing a worn hanger bearing assembly, and methods of retrofitting a screw conveyor with a hanger bearing assembly. The hanger bearing assembly includes an inner bearing having a plurality of inner bearing collar members; an outer bearing having a plurality of outer bearing collar members; and a bearing holder, wherein the inner bearing collar members mechanically engage a unitary shaft of a screw conveyor having multiple screw sections and are attached thereto, such that the unitary shaft and the inner bearing collar members rotate within the outer bearing. The inner bearing protects the unitary shaft such that only the worn inner bearing and outer bearing need to be replaced, saving the time and expense associated with replacement of the unitary shaft.

24 Claims, 13 Drawing Sheets

(56) References Cited

U.S. PATENT DOCUMENTS

| | | | |
|---|---|---|---|
| 4,217,980 A | 8/1980 | Kemp, Jr. | |
| 4,384,643 A | 5/1983 | Cone | |
| 4,691,818 A | 9/1987 | Weber | |
| 4,815,585 A | 3/1989 | May | |
| 4,976,341 A | 12/1990 | Lundell | |
| 5,033,608 A | 7/1991 | Lorimor et al. | |
| 5,370,464 A | 12/1994 | Blaha | |
| 5,709,482 A | 1/1998 | Lutz | |
| 5,797,480 A | 8/1998 | Gaddis et al. | |
| 6,047,532 A | 4/2000 | O'Halloran et al. | |
| 7,090,437 B2 | 8/2006 | Pinkleton | |
| 8,403,128 B2 | 3/2013 | Farrell et al. | |
| 8,561,786 B2 | 10/2013 | Farrell et al. | |
| 9,108,804 B2 | 8/2015 | Marchesini et al. | |
| 10,105,819 B2 | 10/2018 | Ray | |
| 10,160,605 B1 * | 12/2018 | Foster | B65G 33/10 |
| 11,134,651 B2 | 10/2021 | Johnson et al. | |

* cited by examiner

HANGER BEARING ASSEMBLY FOR A SCREW CONVEYOR AND METHODS OF REPLACING AND RETROFITTING THE SAME

FIELD

The present invention relates to a hanger bearing assembly used to support at least one end of a screw section in a screw conveyor having multiple screw sections, a method of replacing a worn hanger bearing assembly, and methods of retrofitting a screw conveyor with a hanger bearing assembly. The hanger bearing assembly includes an inner bearing having a plurality of inner bearing collar members; an outer bearing having a plurality of outer bearing collar members; and a bearing holder, wherein the inner bearing collar members mechanically engage a unitary shaft of a screw conveyor having multiple screw sections and are attached thereto, such that the unitary shaft and the inner bearing collar members rotate within the outer bearing, which is mechanically engaged by the bearing holder. The inner bearing collar members of the hanger bearing assembly protect the unitary shaft from wear caused by the conveyed material and the standard hanger bearing, thereby increasing the service life of unitary shafts.

BACKGROUND

A screw conveyor is a mechanical device used to move various bulk materials from one process point to another. Screw conveyors are used across a wide variety of industries and their configuration can vary based on the particular application for which they are used. In a typical screw conveyor, material is fed into an inlet located at one end of the screw conveyor. A drive unit is located on the opposite end of the screw conveyor near a discharge outlet. Screw sections, which are comprised of a shaft and blades that spiral along the shaft, are housed in a U-shaped trough or a cylindrical tube that extends from the inlet to the discharge outlet. The drive unit drives the screw sections which transport material along the trough or through the cylindrical tube from the inlet to the outlet.

While small screw conveyors are often comprised of a single screw-section, larger screw conveyors are often comprised of multiple screw sections. In this configuration, hanger bearings are used to support unitary shafts which couple the ends of successive screw sections. The hanger bearing is housed within a bearing holder which is attached to the trough or tube via a cross-brace. The hanger bearing maintains the unitary shaft in the center of the trough or tube to prevent the screw sections from contacting the walls of the trough or tube or from collapsing into the trough or tube. Hanger bearings are also used to support the screw conveyor tail shaft. A tail shaft is typically located at the end of the screw conveyor containing the material inlet, opposite the material discharge and drive unit. In this configuration, the hanger bearing can also be called a "tail bearing."

Prior art hanger bearing assemblies comprise a hanger bearing and a bearing holder. In some embodiments, the hanger bearing consists of two collar members. The bearing holder extends from a cross-brace and mechanically engages the collar members, holding the collar members in a fixed position. A unitary shaft passes through the collar members and rotates within the collar members. In this configuration, there is very little clearance between the collar members and the unitary shaft. A prior art hanger bearing assembly with a standard steel bearing contains approximately 0.020" (0.051 cm) of clearance between the unitary shaft and the collar members. Over time, conveyed material enters and builds up in the space created between the unitary shaft and the collar members, which wears both the unitary shaft and the collar members such that they need replaced.

A typical hanger bearing may need replaced as often as several times a year. The process of replacing a hanger bearing is relatively straightforward and requires only a minimal amount of time and labor. The process requires approximately one man-hour and involves accessing the hanger bearing assembly through an opening in the screw conveyor assembly, disassembling the hanger bearing assembly, replacing the worn hanger bearing with a new hanger bearing, and reassembling the hanger bearing assembly. A typical unitary shaft may need replaced as often as every few years. The process of replacing a unitary shaft is much more difficult and requires extensive time and labor. The replacement of a typical unitary shaft requires heavy equipment including a crane and a large forklift, which adds to overall costs and machine downtime. The process requires several workers working over a period of several days to complete. The process involves disassembling most of the screw conveyor assembly, including removing the drive unit from the screw conveyor assembly, removing all internal bearings from the screw conveyor assembly, and removing the screw sections from the trough or tube. Once removed, the screw sections must be placed on a level surface and the old unitary shafts must be uncoupled from the screw sections. After new unitary shafts are installed, the screw sections must be placed back in the trough or tube. All internal bearings and the drive unit must then be reinstalled.

SUMMARY

The present invention relates to a hanger bearing assembly used to support at least one end of a screw section in a multi-screw section screw conveyor, methods for replacing a worn hanger bearing assembly, and methods of retrofitting a screw conveyor with a hanger bearing assembly.

The presently-disclosed subject matter relates to a hanger bearing assembly for a screw conveyor having multiple screw sections. According to one embodiment of the invention, a hanger bearing assembly for a screw conveyor having multiple screw sections includes: an inner bearing having a plurality of inner bearing collar members, said inner bearing collar members having an arcuate inner surface and an arcuate outer surface; an outer bearing having a plurality of outer bearing collar members, said outer bearing collar members having an inner arcuate surface and an outer arcuate surface; and a bearing holder, wherein the arcuate inner surfaces of the plurality of inner bearing collar members mechanically engage an outer arcuate surface of a unitary shaft, where the unitary shaft and the inner bearing are received through the outer bearing, and rotate within the outer bearing.

Further, in some embodiments, the unitary shaft can include a bore extending diametrically therethrough; the plurality of inner bearing collar members can mechanically engage the unitary shaft via a pin; and the pin can pass through the bore in the unitary shaft and the bore in the plurality of inner bearing collar members such that the inner bearing collar members are attached to the unitary shaft. In some further embodiments, there is no clearance between the inner arcuate surfaces of the inner bearing collar members and the outer arcuate surface of the unitary shaft.

In some embodiments, the plurality of outer bearing collar members can contain a plurality of arcuate flanges. Further, in some embodiments, the outer bearing having a plurality of outer bearing collar members contains a plurality of raised portions disposed between the plurality of arcuate flanges. Also, the bearing holder can mechanically engage the outer bearing having a plurality of outer bearing collar members via contact with the plurality of arcuate flanges, the plurality of raised portions, and the outer arcuate surfaces.

According to one embodiment of the invention, the unitary shaft is inserted into at least one end of a screw section for a screw conveyor having multiple screw sections and is connected thereto. In accord with this embodiment of the invention, the hanger bearing assembly can function as a tail bearing assembly.

According to another embodiment of the invention, the unitary shaft is inserted into at least one end of a screw section for a screw conveyor having multiple screw sections and is connected thereto and is inserted into at least one end of an adjacent screw section for a screw conveyor having multiple screw sections and is connected thereto.

Further, in some embodiments, the inner bearing collar members have an inner bearing axial length, the outer bearing collar members have an outer bearing axial length, and the outer bearing axial length is greater than the inner bearing axial length such that the outer bearing collar members encircle the inner bearing collar members.

The presently-disclosed subject matter also relates to a method for replacing a worn hanger bearing assembly installed in a screw conveyor having multiple screw sections. According to one embodiment of the invention, a method for replacing a worn hanger bearing assembly installed in a screw conveyor having multiple screw sections, includes: accessing an interior section of the screw conveyor; removing a bearing holder; removing an outer bearing; removing a pin; removing an inner bearing; installing a new inner bearing; installing a new pin; installing a new outer bearing; and reattaching the bearing holder.

The presently-disclosed subject matter further relates to a method of retrofitting a screw conveyor having multiple screw sections with a hanger bearing assembly. According to one embodiment of the invention, a method of retrofitting a screw conveyor having multiple screw sections with a hanger bearing assembly where none of the unitary shafts need to be replaced, includes: accessing an interior section of the screw conveyor; removing an existing hanger bearing assembly having an original bearing and a bearing holder; boring a pin hole in a unitary shaft of the screw conveyor; installing an inner bearing having a plurality of inner bearing collar members, wherein each inner bearing collar member contains a bore hole extending therethrough; installing a pin through the bore holes in the inner bearing collar members and the unitary shaft; installing a new outer bearing properly sized such that the plurality of inner bearing collar members can rotate within the new outer bearing; and installing a new bearing holder, properly sized such that the bearing holder mechanically engages the new outer bearing.

According to another embodiment of the invention, a method of retrofitting a screw conveyor having a drive unit and multiple screw sections coupled via unitary shafts with a hanger bearing assembly where at least one unitary shaft needs to be replaced, includes: accessing an interior section of the screw conveyor assembly; removing each existing hanger bearing assembly having an original bearing and a bearing holder; removing the drive unit from the screw conveyor assembly; removing the screw sections from the screw conveyor assembly; uncoupling the unitary shafts from the screw sections; removing the unitary shafts from the screw sections; installing unitary shafts having a pin hole extending diametrically therethrough; coupling the unitary shafts having a pin hole extending diametrically therethrough to the screw sections; installing an inner bearing having a plurality of inner bearing collar members, wherein each inner bearing collar member contains a bore hole extending therethrough; installing a pin through the bore holes in the inner bearing collar members and the unitary shaft; inserting the screw sections into the screw conveyor assembly; installing a new outer bearing properly sized such that the plurality of inner bearing collar members can rotate within the new outer bearing; and installing a new bearing holder, properly sized such that the bearing holder mechanically engages the new outer bearing.

The hanger bearing assembly of the present invention includes a plurality of inner bearing collar members that mechanically engage a unitary shaft such that the inner bearing collar members rotate with the unitary shaft. The inner bearing collar members protect the unitary shaft by preventing conveyed material from entering the space between the unitary shaft and the outer bearing collar members. Instead of wearing on the unitary shaft, the material and the standard hanger bearing wear on the inner bearing collar members. Thus, only the worn inner bearing collar members and the standard hanger bearing need to be replaced, saving the time, labor, and expenses associated with replacement of the unitary shaft.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present invention will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example only, and are not construed as limiting the scope of this invention.

DETAILED DESCRIPTION OF THE ILLUSTRATED EMBODIMENTS

Figure 1:
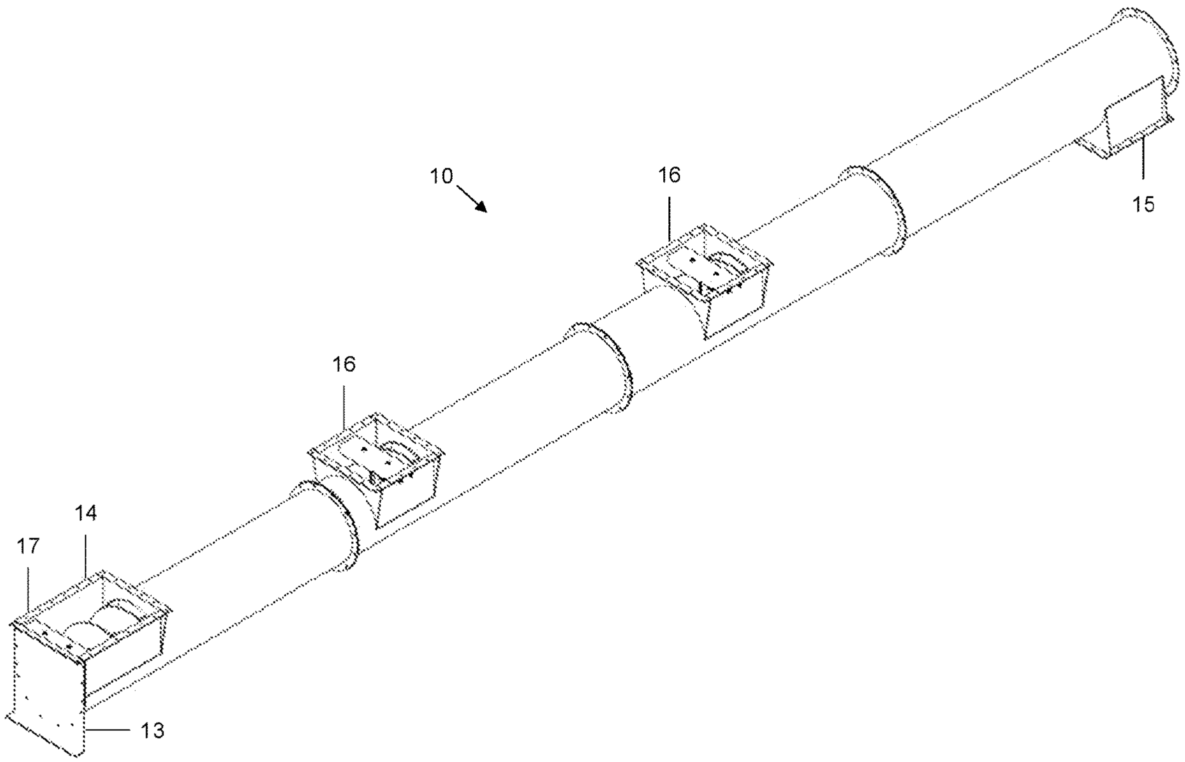
FIG. 1 is a perspective view of a multi-screw section screw conveyor assembly having a plurality of hanger bearing access openings and a tail bearing access opening.

For the purposes of promoting an understanding of the principles of the invention disclosed herein, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein; such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

The following legend relates to the numbers shown in the drawings: 10—screw conveyor assembly; 12—screw section; 13—inlet hatch; 14—material inlet; 15—material outlet; 16—hanger bearing access opening; 17—tail bearing access opening; 18—coupling bolts; 19—nuts; 20—prior art unitary shaft; 21—unitary shaft; 22—pin hole; 23—bore hole; 24—pin; 30—prior art hanger bearing assembly; 32—bearing; 34—bearing collar members; 36—arcuate flanges; 38—bearing holder; 40—arm members; 43—bolt holes; 44—coupling bolts; 46—nuts; 50—cross-brace; 52—coupling bolts; 54—nuts; 60—hanger bearing assembly of the present invention; 62—inner bearing; 64—inner bearing collar members; 66—pin hole; 68—outer bearing; 70—outer bearing collar members; 72—arcuate flanges; 74—male profiles; 76—bearing holder; 78—arm members; 80—finger portion; 82—clamp portion; 83—bolt holes; 84—coupling bolts; 86 nuts; 87—gusset; 90—cross-brace; 92—coupling bolts; 94—nuts; 120—prior art tail shaft; 121 tail shaft; 122—pin hole; 130—prior art tail bearing assembly; 132—bearing; 134—bearing collar members; 136—arcuate flanges; 138—bearing holder; 140—arm members; 144—coupling bolts; 146—nuts; 150—cross-brace; 152—coupling bolts; 154—nuts.

Embodiments of the present invention include a hanger bearing assembly for a screw conveyor having multiple screw sections. The present invention includes an inner bearing having a plurality of inner bearing collar members; an outer bearing having a plurality of outer bearing collar members; and a bearing holder, wherein the inner bearing collar members mechanically engage a unitary shaft of a screw conveyor having multiple screw sections and are attached thereto, such that the unitary shaft and the inner bearing collar members rotate within the outer bearing, and the bearing holder mechanically engages the outer bearing.

Referring to FIG. 1, a screw conveyor assembly 10 having an inlet hatch 13, a material outlet 15, a plurality of hanger bearing access openings 16, and a tail bearing access opening 17, which also serves as a material inlet 14 is shown. The plurality of hanger bearing access openings 16 will be closed during operation of the screw conveyor assembly 10. The material inlet 14 will be open to receive material, and the material outlet 15 will be open to outlet material during operation of the screw conveyor assembly 10.

Figure 2:
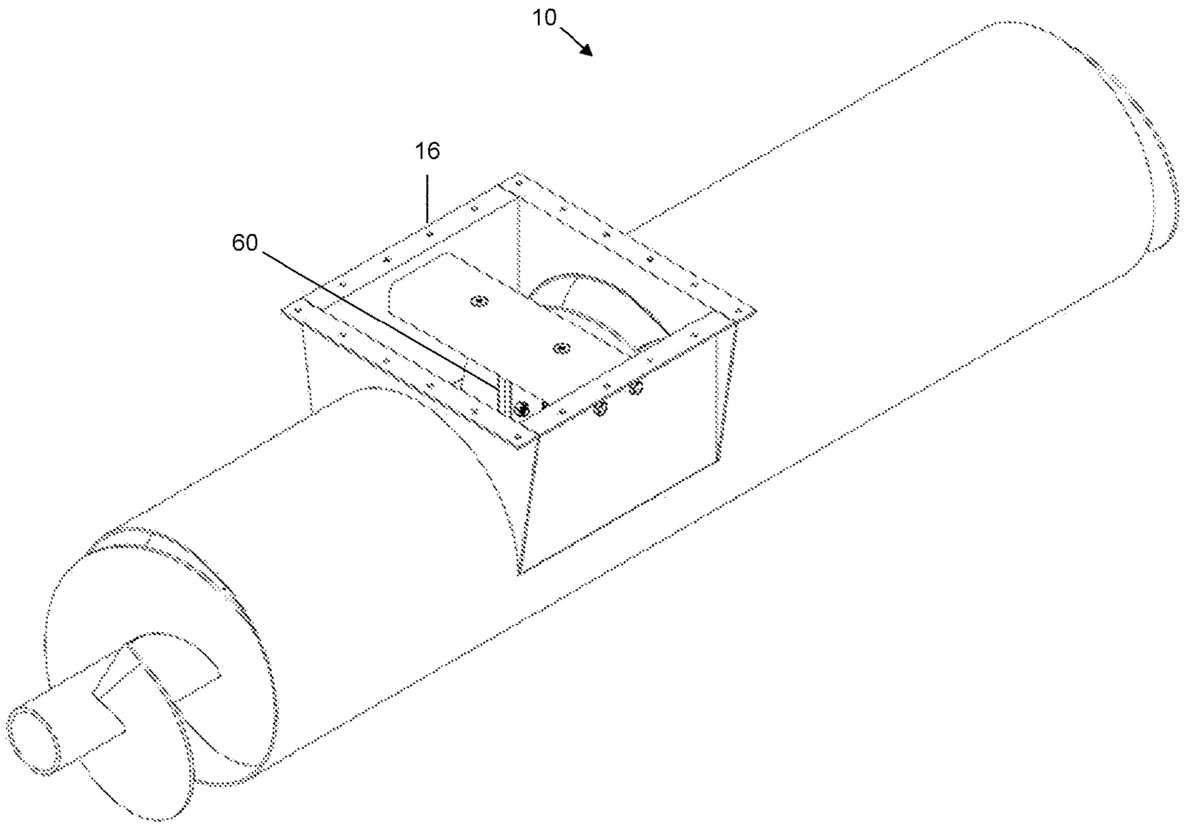
FIG. 2 is a perspective view of one of the hanger bearing access openings of the multi-screw section screw conveyor assembly of FIG. 1.

Now referring to FIG. 2, a hanger bearing assembly of the present invention 60 is accessible via the hanger bearing access opening 16. As is common in engineering drawings, the screw conveyor assembly 10 is truncated for purposes of illustration.

Figure 3:
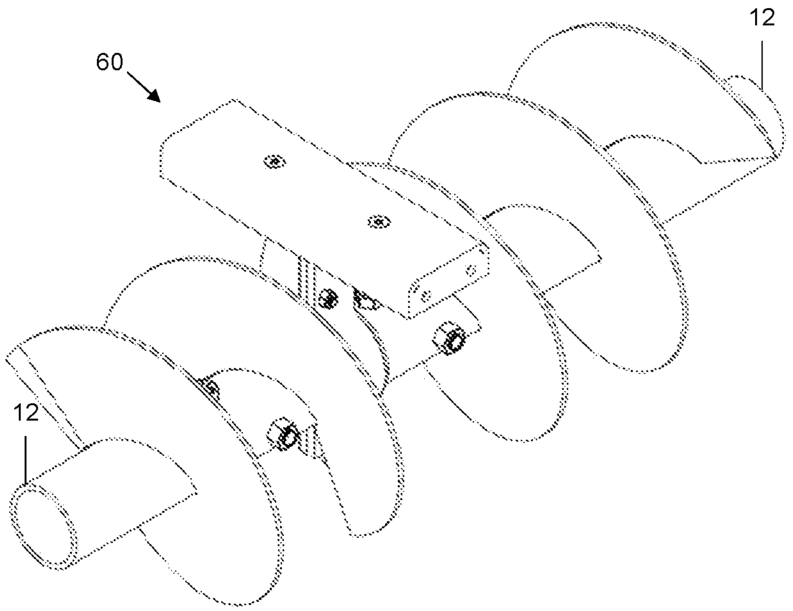
FIG. 3 is a perspective view of the hanger bearing assembly of the present invention disposed over a unitary shaft for a multi-screw section screw conveyor.
Figure 4:
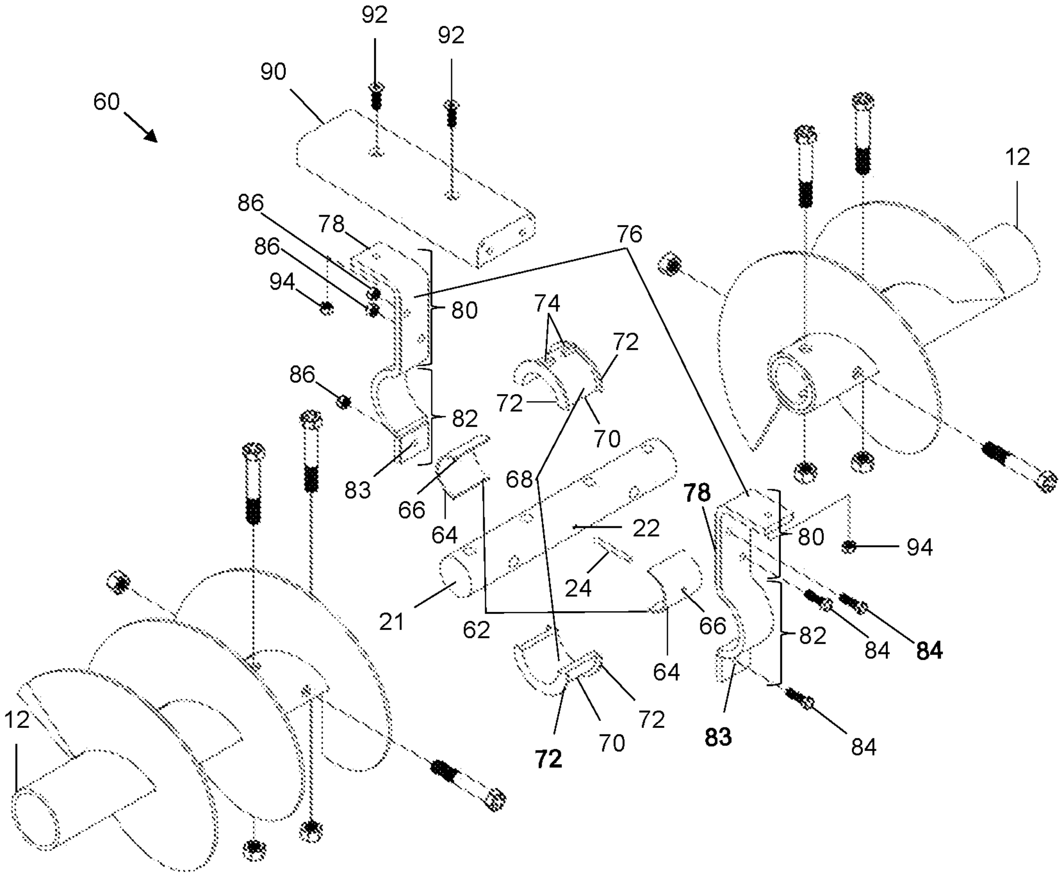
FIG. 4 is an exploded view of the hanger bearing assembly of the present invention.

Now referring to FIG. 3, in the depicted embodiment, the hanger bearing assembly of the present invention 60 is shown removed from the screw conveyor assembly 10 of FIGS. 1 and 2. FIG. 4 is an exploded view of the hanger bearing assembly of the present invention 60, which includes an inner bearing 62, an outer bearing 68, and a bearing holder 76. The inner bearing 62 is comprised of two inner bearing collar members 64. Each inner bearing collar member 64 includes a pin hole 66. The outer bearing 68 is comprised of two outer bearing collar members 70. Each outer bearing collar member 70 contains a pair of arcuate flanges 72 and a pair of male profiles 74 disposed between the arcuate flanges 72. The bearing holder 76 is comprised of two arm members 78 having a finger portion 80 and a clamp portion 82. As is common in engineering drawings, screw sections 12 are truncated for purposes of illustration.

Referring further to FIG. 4, in the depicted embodiment, the inner bearing collar members 64 are positioned around a unitary shaft 21 such that the unitary shaft 21 passes coaxially through the aperture formed by the inner bearing collar members 64. The inner bearing collar members 64 fit snugly against the unitary shaft 21 with zero clearance between the unitary shaft 21 and the inner bearing collar members 64. The inner bearing collar members 64 mechanically engage the unitary shaft 21 via a pin 24. The pin 24 passes through a pin hole 22 in the unitary shaft 21 and passes through the pin hole 66 of each inner bearing collar member 64. The inner bearing collar members 64 and unitary shaft 21 rotate simultaneously within the outer bearing collar members 70, with approximately 0.020"-0.030" (0.051 to 0.076 cm) clearance between the inner bearing collar members 64 and the outer bearing collar members 70. The clamp portion 82 of the arm members 78 mechanically engages the outer bearing collar members 70. The clamp portions 82 of the arm members 78 are positioned between the arcuate flanges 72 of each outer bearing collar member 70 such that the arcuate flanges 72 of each collar member 70 are situated outside the clamp portion 82 of the arm members 78. When the clamp portions 82 of the arm members 78 mechanically engages the outer bearing collar members 70, the male profiles 74 of the outer bearing collar members 70 are positioned within openings formed when the arm members 78 are coupled to one another. The male profiles 74 prevent the outer bearing collar members 70 from freely rotating within the clamp portion 82 of the arm members 78. In the depicted embodiment, each pair of male profiles 74 is positioned 180° from one another. When the hanger bearing assembly of the present invention 60 is assembled, the arm members 78 of the bearing holder 76 are coupled via coupling bolts 84 and their corresponding nuts 86. The arm members 78 of the bearing holder 76 extend from the outer bearing 68 to the cross-brace 90 and couple to the cross-brace 90 via coupling bolts 92 and their corresponding nuts 94. The cross-brace 90 couples to the screw conveyor assembly 10 via coupling bolts.

In some embodiments, the pin 24 has a uniform diameter along its length and is driven through the inner bearing collar members 64 and the unitary shaft 21 via a hammer. In some embodiments, the pin 24 is unthreaded and an adhesive is used to secure the pin 24 in the inner bearing collar members 64. In other embodiments, the pin 24 is knurled. A combination of these methods may be used to attach the pin 24 and the inner bearing collar members 64.

Based on initial test results, the unitary shaft 21 preferably has a Rockwell C hardness between 40-45, the inner bearing collar members 64 preferably have a Rockwell C hardness between 48-52, the outer bearing collar members 70 preferably have a Rockwell C hardness between 55-60, and the pin 24 preferably has a Rockwell B hardness of 75. The combination of Rockwell hardnesses for the various components is currently in the testing phase and may be subject to change. Based on initial test results, the pin 24 is the softest so that it will wear evenly with the inner bearing collar members 64 and will not gouge the outer bearing collar members 70 during operation of the screw conveyor assembly 10.

Figure 5:
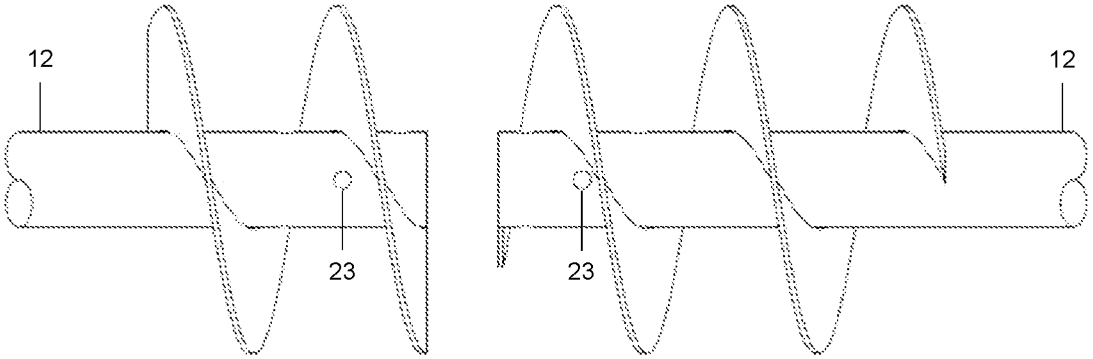
FIG. 5 is a side plan view along the long axis of a multi-screw section screw conveyor showing portions of two uncoupled successive screw sections.

Now referring to FIG. 5, in the depicted embodiment, portions of two successive screw sections 12 are shown positioned for alignment. Each screw section 12 contains bore holes 23. As is common in engineering drawings, the screw sections 12 are truncated for purposes of illustration.

Figure 6:
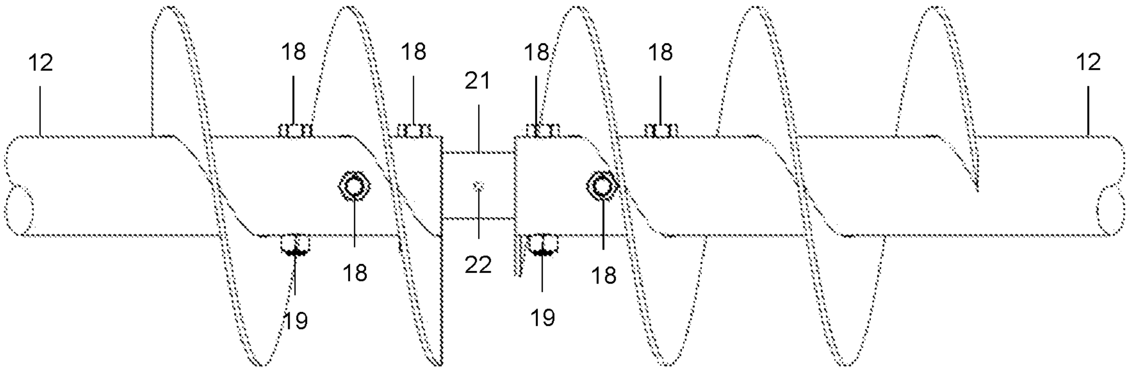
FIG. 6 is a side plan view along the long axis of a multi-screw section screw conveyor showing a unitary shaft positioned between portions of the screw sections of FIG. 5 and connected thereto.

Now referring to FIG. 6, in the depicted embodiment, a unitary shaft 21 having a pin hole 22 is positioned coaxially between screw sections 12. The unitary shaft 21 mechanically engages each screw section 12 via three coupling bolts 18 and their corresponding nuts 19, which pass through bore holes 23 in the screw sections 12 and corresponding bore holes in the unitary shaft 21. The coupling bolts 18 and nuts 19 prevent the unitary shaft 21 from breaking free of the screw sections 12 during operation of the screw conveyor assembly 10. As is common in engineering drawings, the screw sections 12 are truncated for purposes of illustration.

Figure 7:
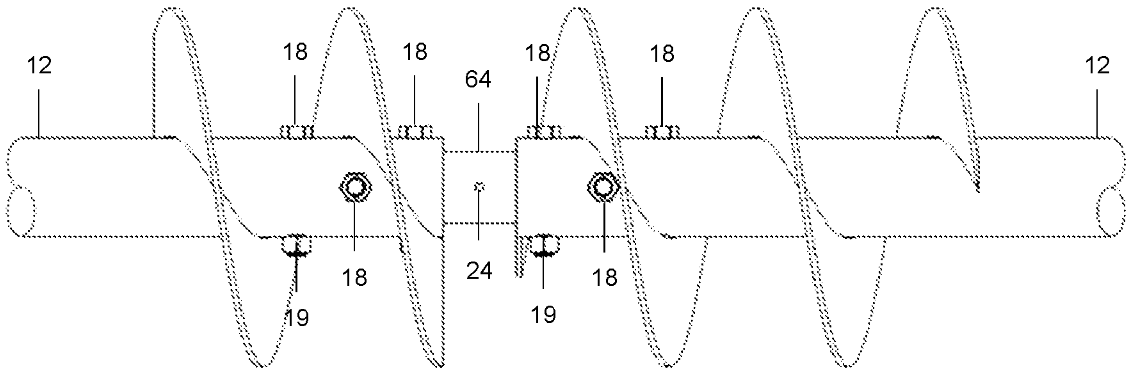
FIG. 7 is a side plan view along the long axis of a multi-screw section screw conveyor showing the inner bearing disposed over the unitary shaft.

Now referring to FIG. 7, in the depicted embodiment, the inner bearing collar members 64 are positioned around the unitary shaft 21 such that the unitary shaft 21 passes coaxially through the aperture formed by the inner bearing collar members 64. The inner bearing collar members 64 snugly engage the unitary shaft 21 so that there is no clearance between the unitary shaft 21 and the inner bearing collar members 64. The inner bearing collar members 64 mechanically engage the unitary shaft 21 via a pin 24. The pin 24 first passes through a pin hole 66 extending through the first inner bearing collar member 64. The pin 24 then passes through the pin hole 22 extending diametrically through the unitary shaft 21. The pin then passes through a pin hole 66 extending through the second inner bearing collar member 64. The curvature of the inner bearing collar members 64 wholly abuts the curvature of the unitary shaft 21, such that the inner bearing collar members 64 rotate simultaneously with the unitary shaft 21 during operation of the screw conveyor assembly 10. The inner bearing collar members 64 prevent conveyed material from contacting the unitary shaft 21 within the hanger bearing assembly of the present invention 60 and protects the unitary shaft 21 from wear caused by conveyed material and the outer bearing collar members 70. As is common in engineering drawings, the screw sections 12 are truncated for purposes of illustration.

Figure 8:
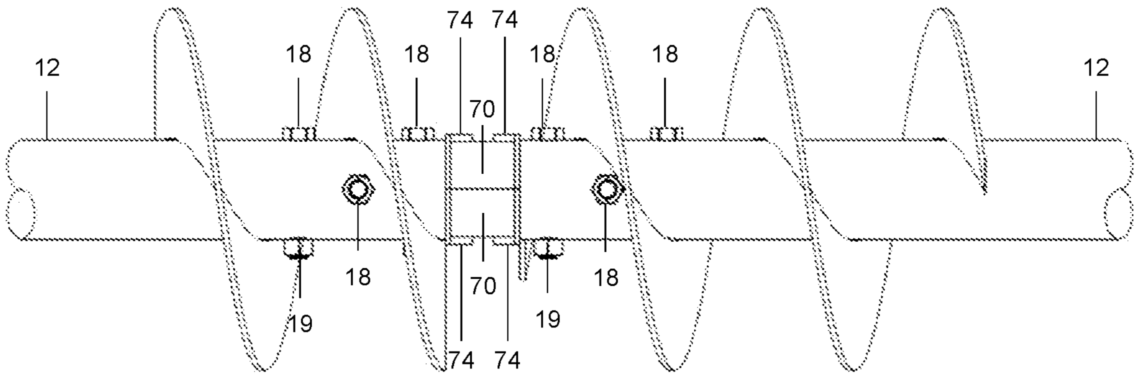
FIG. 8 is a side plan view along the long axis of a multi-screw section screw conveyor showing the outer bearing disposed over the inner bearing.

Now referring to FIG. 8, in the depicted embodiment, the outer bearing collar members 70 are positioned around the inner bearing collar members 64 (not pictured). Further, the inner bearing collar members 64 have an inner bearing axial length and where the outer bearing collar members 70 have an outer bearing axial length, and where the outer bearing axial length is greater than the inner bearing axial length such that the outer bearing collar members 70 encircle the inner bearing collar members 64. The pin 24 (not pictured) and inner bearing collar members 64 (not pictured) are contained interior to the outer bearing collar members 70. When the outer bearing collar members 70 are positioned around the inner bearing collar members 64, the outer bearing collar members 70 have the shape of a cylinder with slightly enlarged end portions. The outer bearing collar members 70 and the inner bearing collar members 64 have a clearance of 0.020"-0.030" (0.051 to 0.076 cm) so that the unitary shaft 21 with attached inner bearing collar members 64 can rotate within the outer bearing collar members 70. In the depicted embodiment, each pair of male profiles 74 is positioned 180° from one another. As is common in engineering drawings, the screw sections 12 are truncated for purposes of illustration.

Figure 9:
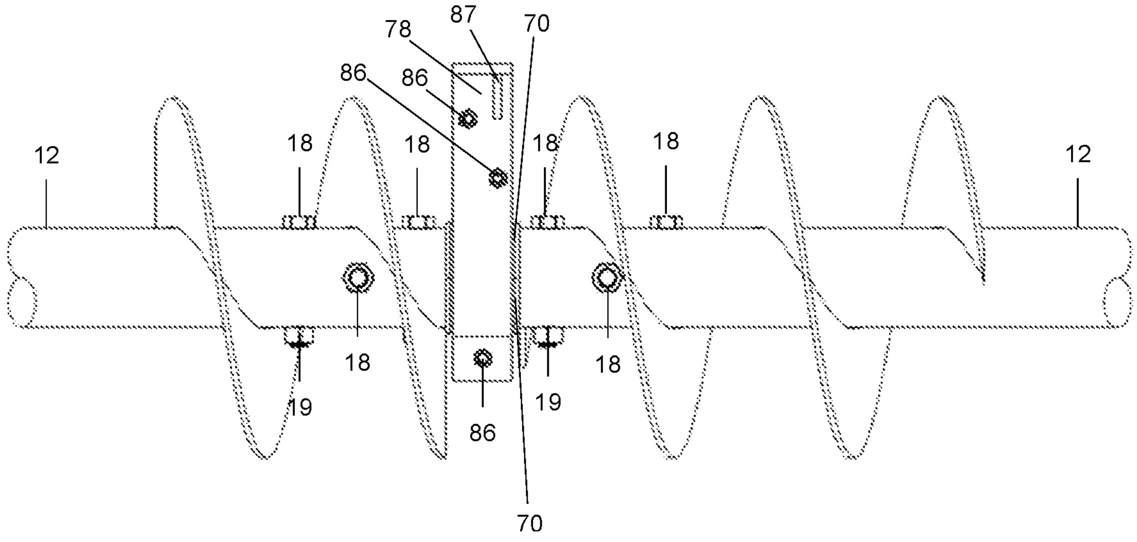
FIG. 9 is a side plan view along the long axis of a multi-screw section screw conveyor showing the bearing holder disposed over the outer bearing.

Now referring to FIG. 9, in the depicted embodiment, the arm members 78 of the bearing holder 76 are positioned around the outer bearing collar members 70. The arm members 78 are coupled via coupling bolts 84 and their corresponding nuts 86. In the depicted embodiment, the arm members 78 include a gusset 87 that serves to strengthen the bend in the finger portion 80. In other embodiments, the arm members 78 will not include a gusset 87. As is common in engineering drawings, the screw sections 12 are truncated for purposes of illustration.

In order to replace a worn hanger bearing assembly of the present invention 60 with a new hanger bearing assembly of the present invention 60, the worn hanger bearing assembly of the present invention 60 must be accessed via the hanger bearing access opening 16 in the screw conveyor assembly 10. The cross-brace 90 must be detached from the screw conveyor assembly 10. The cross-brace 90 must then be detached from the arm members 78 by removing the coupling bolts 92 and their corresponding nuts 94. The cross-brace 90 must then be removed from the screw conveyor assembly 10 via the hanger bearing access opening 16. The arm members 78 must be uncoupled from one another by removing the coupling bolts 84 and their corresponding nuts 86. The arm members 78 must then be removed from the screw conveyor assembly 10 via the hanger bearing access opening 16. The outer bearing collar members 72 must then be removed from the screw conveyor assembly 10 via the hanger bearing access opening 16. The pin 24 must then be removed from the inner bearing collar members 64 and unitary shaft 21. The pin 24 and the inner bearing collar members 64 must then be removed from the screw conveyor assembly 10 via the hanger bearing access opening 16. New inner bearing collar members and a new pin must then be introduced to the screw conveyor assembly 10 via the hanger bearing access opening 16. In some embodiments, the pin 24 may be reinstalled instead of being replaced with a new pin. The new inner bearing collar members must be fitted over the unitary shaft 21 such that the pin holes in the collar members align with the pin hole 22 in the unitary shaft 21. A new pin must be inserted through the pin hole in the first new inner bearing collar member, the pin hole 22 in the unitary shaft 21, and the pin hole in the second new inner bearing collar member. New outer bearing collar members, arm members 78, coupling bolts 84, and their corresponding nuts 86 must then be introduced to the screw conveyor assembly 10 via the hanger bearing access opening 16. The new outer bearing collar members must be aligned such that the male profiles of the new outer bearing collar members are positioned within the openings created when the arm members 78 are coupled to one another. In some embodiments, the outer bearing collar members 72 may be reinstalled instead of being replaced with new outer bearing collar members. The arm members 78 must then be reattached to one another by inserting the coupling bolts 84 through the bolt holes 83 and tightening their corresponding nuts 86. The cross-brace 90 must then be reintroduced into the screw conveyor assembly 10 via the hanger bearing access opening 16. The cross-brace 90 must then be reattached to the arm members 78 via the coupling bolts 92 and their corresponding nuts 94. The cross-brace must then be reattached to the screw conveyor assembly 10. This process can be repeated for each hanger bearing assembly of the present invention 60 located in the screw conveyor assembly 10.

Figure 10:
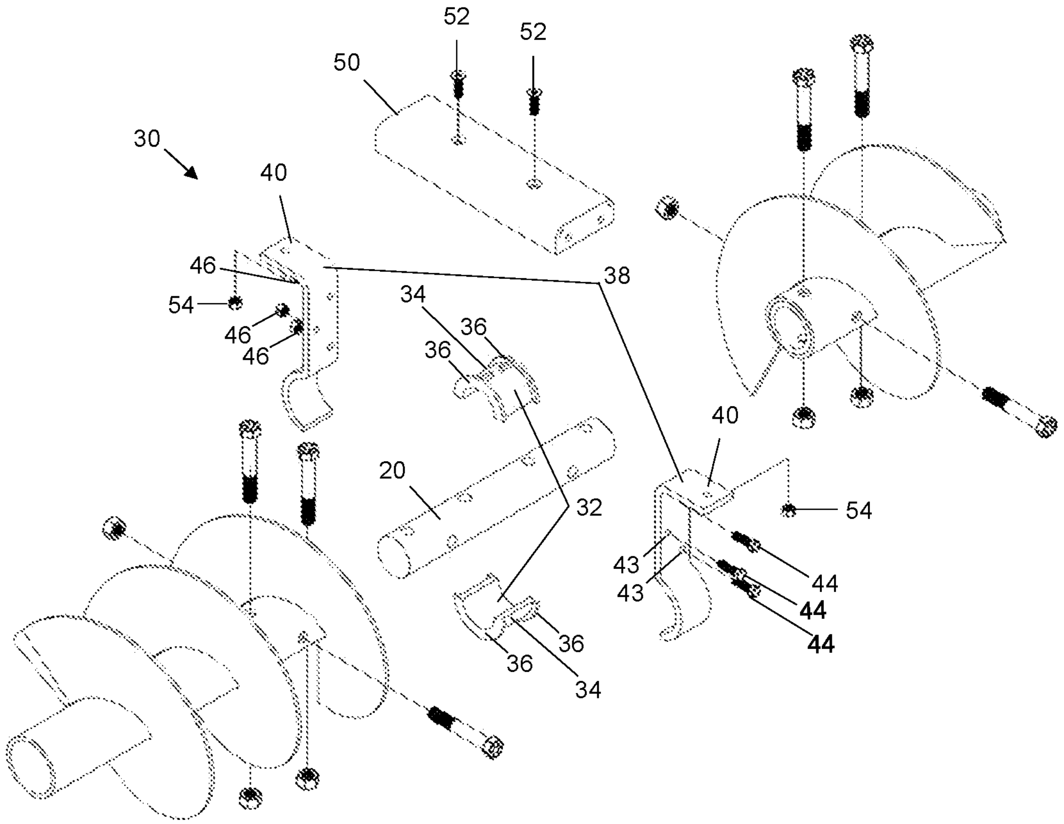
FIG. 10 Prior art
FIG. 10 is an exploded view of a prior art hanger bearing assembly in relation to a unitary shaft and screw sections for a multi-screw section screw conveyor.

Now referring to FIG. 10, a prior art hanger bearing assembly 30 includes a bearing 32 and a bearing holder 38. The bearing 32 is comprised of two bearing collar members 34. Each bearing collar member 34 contains arcuate flanges 36. The bearing holder 38 is comprised of two arm members 40 that extend from the bearing 32 to a cross-brace 50. The two arm members 40 of the bearing holder 38 couple to the cross-brace 50 via coupling bolts 52 and their corresponding nuts 54. In the depicted embodiment, the collar members 34 are positioned around a unitary shaft 20 such that the unitary shaft 20 passes coaxially through the aperture formed by the collar members 34. During operation of the screw conveyor assembly (not pictured), the unitary shaft 20 rotates inside the bearing collar members 34, with a 0.020" (0.051 cm) clearance between the unitary shaft 20 and the bearing collar members 34. The arm members 40 of the bearing holder 38 mechanically engage the bearing collar members 34. The arm members 40 are positioned between the arcuate flanges 36 of each bearing collar member 34 such that the arcuate flanges 36 of each bearing collar member 34 are situated outside the arm members 40.

In order to retrofit an existing screw conveyor assembly with a hanger bearing assembly of the present invention 60 where the unitary shaft 21 does not need to be replaced, the prior art hanger bearing assembly 30 must be accessed via a hanger bearing access opening in the screw conveyor assembly. The cross-brace 50 must be detached from the screw conveyor assembly. The cross-brace 50 must then be detached from the arm members 40 by removing the coupling bolts 52 and their corresponding nuts 54. The cross-brace 50 must then be removed from the from the screw conveyor assembly via the hanger bearing access opening. The arm members 40 must then be detached from one another by removing the coupling bolts 44 and their corresponding nuts 46. The arm members 40 must then be removed from the screw conveyor assembly via the hanger bearing access opening. The bearing collar members 34 must then be removed from the screw conveyor assembly via the hanger bearing access opening. The bearing collar members 34 and arm members 40 may be discarded, as they are unable to be reinstalled as part of the hanger bearing assembly of the present invention 60. A pin hole must be bored diametrically through the unitary shaft. Inner bearing collar members and a pin must be introduced into the screw conveyor assembly via the hanger bearing access opening. The inner bearing collar members must be fitted over the unitary shaft such that the pin holes in the inner bearing collar members align with the pin hole bored in the unitary shaft. The pin must be inserted through the pin hole of the first inner bearing collar member, the pin hole in the unitary shaft, and the pin hole in the second inner bearing collar member. New outer bearing collar members, new arm members, and new coupling bolts and their corresponding nuts must be introduced into the screw conveyor assembly via the hanger bearing access opening. The new outer bearing collar members must be sized such that the unitary shaft and inner bearing collar members can rotate within the outer bearing collar members, with 0.020"-0.030" (0.051 to 0.076 cm) clearance between the inner bearing collar members and outer bearing collar members. The new arm members must be sized such that they can accommodate the new outer bearing collar members. The new outer bearing collar members must be aligned such that the male profiles of the outer bearing collar members are positioned within the openings created when the new arm members are coupled to one another. The new arm members must be coupled to one another by inserting the coupling bolts through the bolt holes and tightening their corresponding nuts. The cross-brace must be reintroduced into the screw conveyor assembly via the hanger bearing access opening. The cross-brace must be attached to the new arm members via the new coupling bolts and their corresponding nuts. The cross-brace must be reattached to the screw conveyor assembly. This process can be repeated for each prior art hanger bearing assembly 30 located in the screw conveyor assembly.

In order to retrofit an existing screw conveyor assembly with a hanger bearing assembly of the present invention 60 where one or more unitary shafts 20 need to be replaced, each prior art hanger bearing assembly 30 must be accessed and disassembled via the procedure set forth in Paragraph 0043. The drive unit must also be removed from the screw conveyor assembly. The screw shaft must be removed from the screw conveyor assembly. Each unitary shaft 20 must be uncoupled from its respective screw section by removing each coupling bolt and its corresponding nut. Each unitary shaft 20 must be removed from the screw sections to which it was coupled. Unitary shafts 21 must be inserted into the screw sections where the unitary shafts 20 were removed. Each unitary shaft 21 must be coupled to its respective screw sections by placing coupling bolts 18 and their corresponding nuts 19 through bore holes 23. The screw shaft must then be placed back in the screw conveyor assembly. A hanger bearing assembly of the present invention 60 can be assembled via the procedure set forth in Paragraph 0043 for each prior art hanger bearing assembly 30 that was removed from the screw conveyor assembly.

Figure 11:
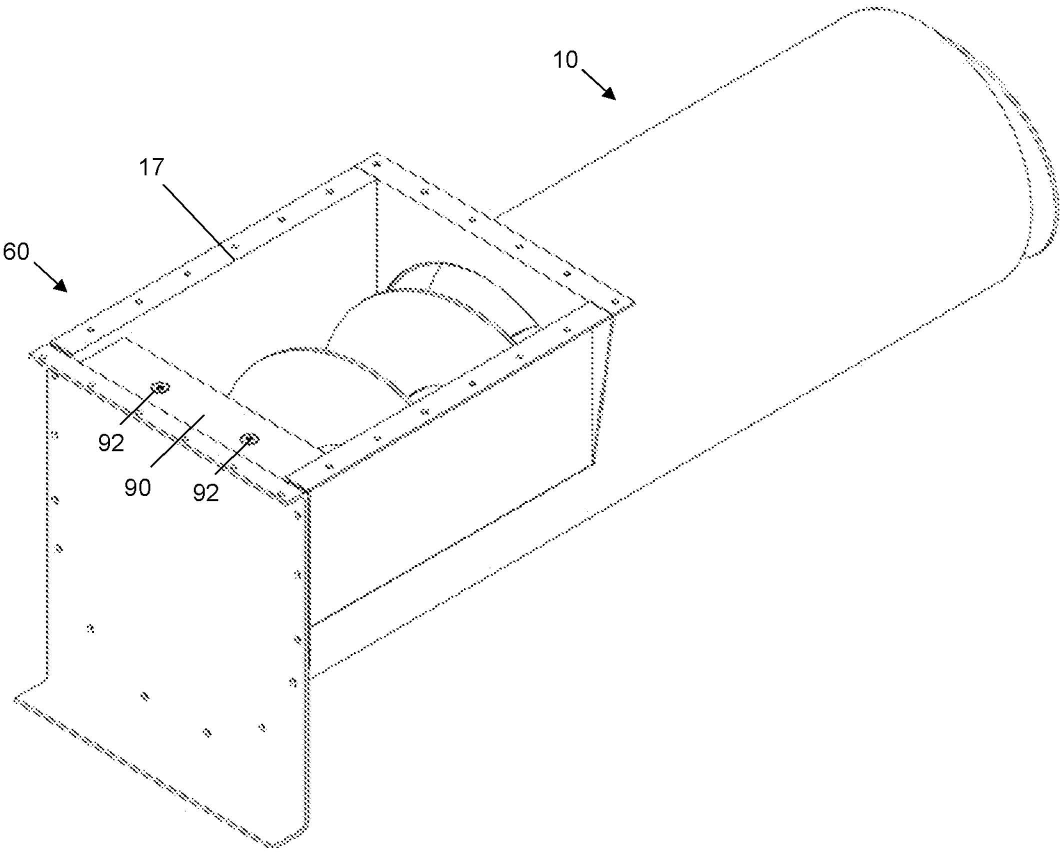
FIG. 11 is a perspective view of a tail bearing access opening of the multi-screw section screw conveyor assembly of FIG. 1.

Now referring to FIG. 11, in the depicted embodiment, the hanger bearing assembly of the present invention 60 (not visible) functions as a tail bearing. The hanger bearing assembly of the present invention 60 (not visible) is accessible via the tail bearing access opening 17 in the screw conveyor assembly 10. As is common in engineering drawings, the screw conveyor assembly 10 is truncated for purposes of illustration.

Figure 12:
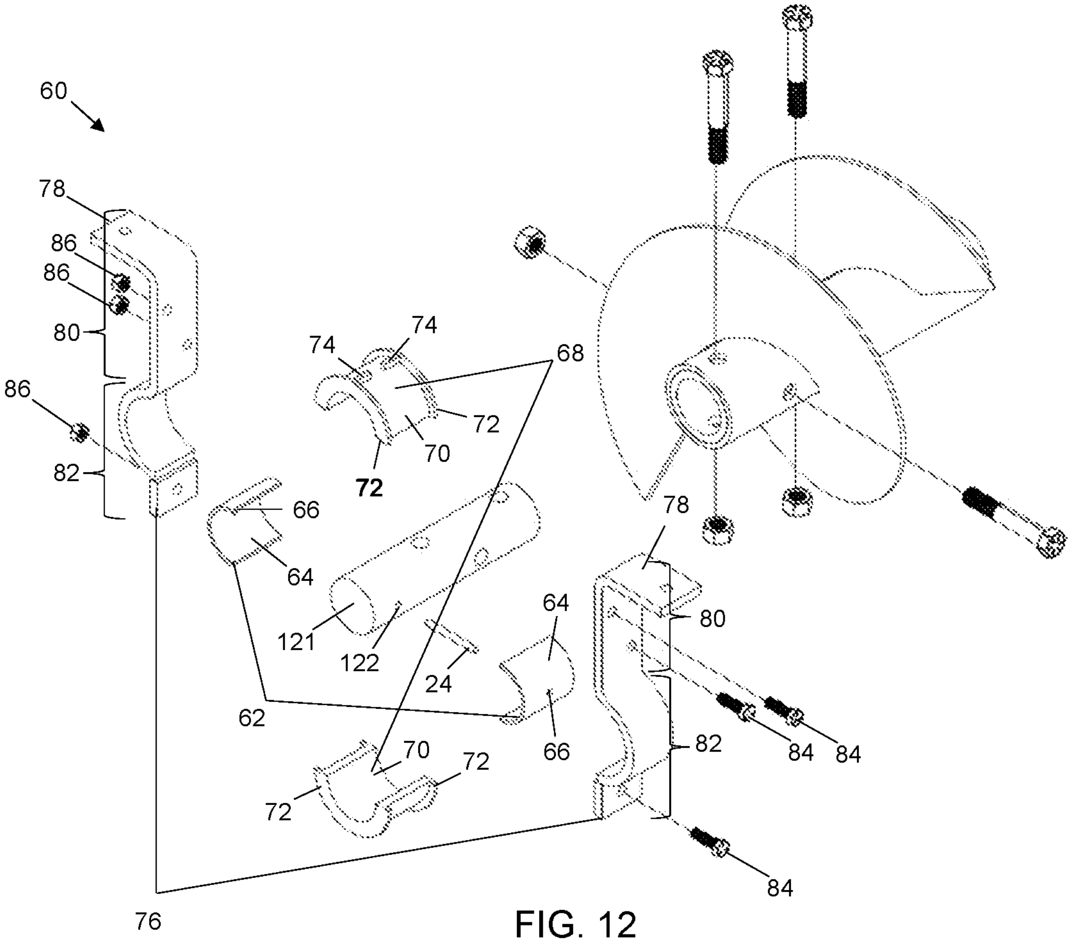
FIG. 12 is an exploded view of the hanger bearing assembly of the present invention functioning as a tail bearing assembly.

Now referring to FIG. 12, in the depicted embodiment, the hanger bearing assembly of the present invention 60 functions as a tail bearing assembly. The hanger bearing assembly of the present invention 60 includes an inner bearing 62, an outer bearing 68, and a bearing holder 76. The inner bearing 62 is comprised of two inner bearing collar members 64. Each inner bearing collar member 64 includes a pin hole 66. The outer bearing 68 is comprised of two outer bearing collar members 70. Each outer bearing collar member 70 contains a pair of arcuate flanges 72 and a pair of male profiles 74 disposed between the arcuate flanges 72. The bearing holder 76 is comprised of two arm members 78 having a finger portion 80 and a clamp portion 82. In the depicted embodiment, the inner bearing collar members 64 are positioned around a unitary tail shaft 121 such that the unitary tail shaft 121 passes coaxially through the aperture formed by the inner bearing collar members 64. The inner bearing collar members 64 fit snugly against the unitary tail shaft 121 with zero clearance between the unitary tail shaft 121 and the inner bearing collar members 64. The inner bearing collar members 64 mechanically engage the unitary tail shaft 121 via a pin 24. The pin 24 passes through a pin hole 122 in the unitary tail shaft 121 and passes through the pin hole 66 of each inner bearing collar member 64. The inner bearing collar members 64 and unitary tail shaft 121 rotate simultaneously within the outer bearing collar members 70, with approximately 0.020"-0.030" (0.051-0.076 cm) clearance between the inner bearing collar members 64 and the outer bearing collar members 70. The clamp portion 82 of the arm members 78 mechanically engages the outer bearing collar members 70. The clamp portions 82 of the arm members 78 are positioned between the arcuate flanges 72 of each outer bearing collar member 70 such that the arcuate flanges 72 of each collar member 70 are situated outside the clamp portion 82 of the arm members 78. When the clamp portions 82 of the arm members 78 mechanically engages the outer bearing collar members 70, the male profiles 74 of the outer bearing collar members 70 are positioned within openings formed when the arm members 78 are coupled to one another. The male profiles 74 prevent the outer bearing collar members 70 from freely rotating within the clamp portion 82 of the arm members 78. In the depicted embodiment, each pair of male profiles 74 is positioned 180° from one another. When the hanger bearing assembly of the present invention 60 functioning as a tail bearing assembly is assembled, the arm members 78 of the bearing holder 76 are coupled via coupling bolts 84 and their corresponding nuts 86. The arm members 78 of the bearing holder 76 extend from the outer bearing 68 to the cross-brace 90 and couple to the cross-brace 90 (FIG. 11) via coupling bolts 92 (FIG. 11). The cross-brace 90 couples to the screw conveyor assembly 10 (FIG. 11) via coupling bolts. As is common in engineering drawings, the screw section 12 is truncated for purposes of illustration.

Figure 13:
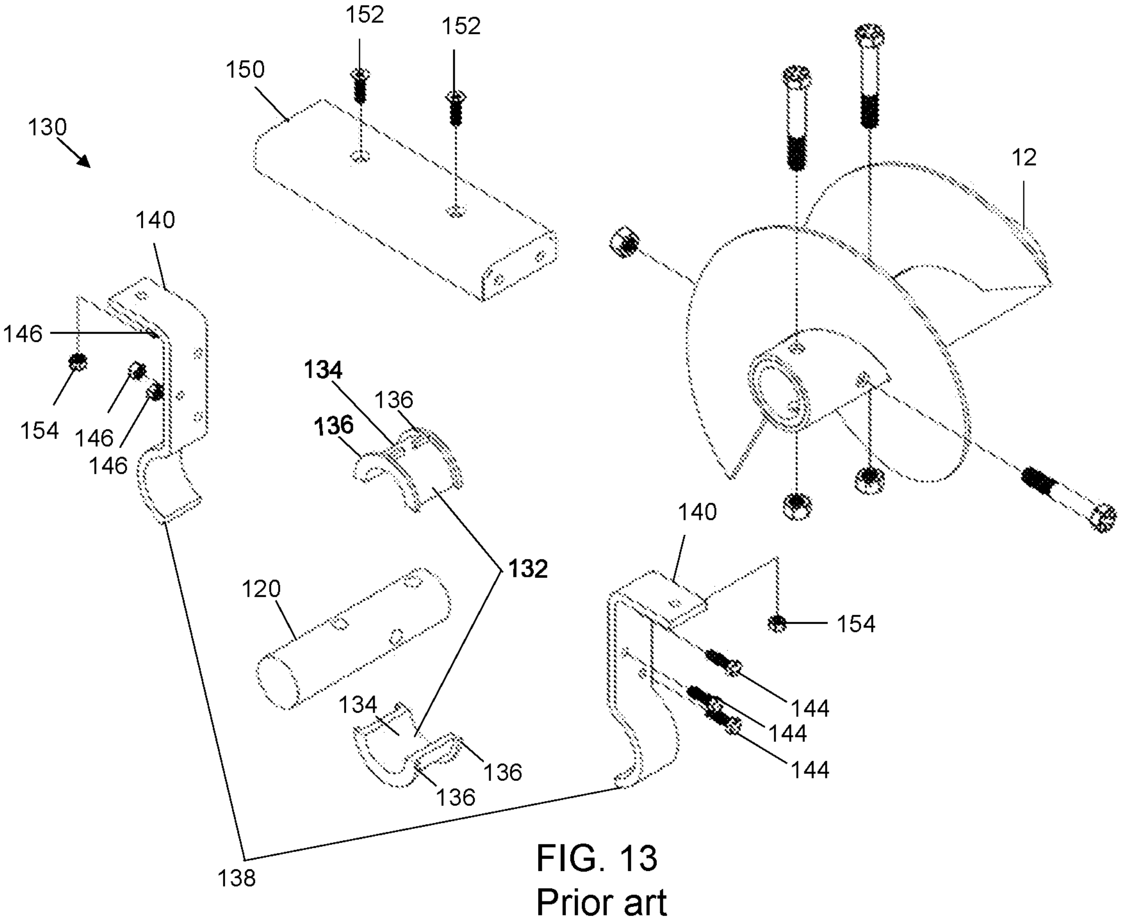
FIG. 13 Prior art
FIG. 13 is an exploded view of a prior art tail bearing assembly.

Now referring to FIG. 13, a prior art tail bearing assembly 130 includes a bearing 132 and a bearing holder 138. The bearing 132 is comprised of two bearing collar members 134. Each bearing collar member 134 contains arcuate flanges 136. The bearing holder 138 is comprised of two arm members 140 that extend from the bearing 132 to a cross-brace 150. The two arm members 140 of the bearing holder 138 couple to the cross-brace 150 via coupling bolts 152 and their corresponding nuts 154. In the depicted embodiment, the bearing collar members 134 are positioned around a tail shaft 120 such that the tail shaft 120 passes coaxially through the aperture formed by the bearing collar members 134. During operation of the screw conveyor assembly (not pictured), the tail shaft 120 rotates inside the bearing collar members 134, with a 0.020" (0.051 cm) clearance between the tail shaft 120 and bearing collar members 134. The arm members 140 of the bearing holder 138 mechanically engage the bearing collar members 134. The arm members 140 are positioned between the arcuate flanges 136 of each bearing collar member 134 such that the arcuate flanges 136 of each bearing collar member 134 are situated outside the arm members 140. When the prior art tail bearing assembly 130 is assembled, the arm members 140 of the bearing holder 138 are coupled via coupling bolts 144 and their corresponding nuts 146. As is common in engineering drawings, the screw section 12 is truncated for purposes of illustration.

While examples, one or more representative embodiments, and specific forms of the disclosure, have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

What is claimed is:

1. A hanger bearing assembly for a screw conveyor having multiple screw sections, comprising: an inner bearing having a plurality of inner bearing collar members, said inner bearing collar members having an arcuate inner surface, an arcuate outer surface, and an axial length; an outer bearing having a plurality of outer bearing collar members, said outer bearing collar members having an inner arcuate surface, an outer arcuate surface, and an axial length; and a bearing holder, wherein the axial length of the outer bearing collar members is greater than the axial length of the inner bearing collar members, wherein the outer bearing collar members encircle the inner bearing collar members, wherein the arcuate inner surfaces of the plurality of inner bearing collar members mechanically engage an outer arcuate surface of a unitary shaft, wherein the unitary shaft connects two adjacent screw sections, wherein the unitary shaft and the inner bearing are received through the outer bearing, and rotate within the outer bearing, wherein there is clearance between each inner arcuate surface of the outer bearing collar members and each arcuate outer surface of the inner bearing collar members, wherein the unitary shaft has a first hardness, the inner bearing collar members have a second hardness, the outer bearing collar members have a third hardness, and wherein the second hardness is harder than the first hardness and the third hardness is harder than the second hardness.

2. The hanger bearing assembly of claim 1 where the plurality of outer bearing collar members contains a plurality of radially outwardly extending arcuate flanges.

3. The hanger bearing assembly of claim 2 where the outer bearing having a plurality of outer bearing collar members contains a plurality of raised portions disposed between the plurality of arcuate flanges.

4. The hanger bearing assembly of claim 3 where the bearing holder mechanically engages the outer bearing having a plurality of outer bearing collar members via contact with the plurality of arcuate flanges, the plurality of raised portions, and the outer arcuate surfaces.

5. The hanger bearing assembly of claim 1 where the unitary shaft is inserted into at least one end of a screw section for a screw conveyor having multiple screw sections and is connected thereto.

6. The hanger bearing assembly of claim 5 where the hanger bearing assembly functions as a tail bearing assembly.

7. The hanger bearing assembly of claim 1 where the unitary shaft is inserted into at least one end of a screw section for a screw conveyor having multiple screw sections and is connected thereto and is inserted into at least one end of an adjacent screw section for a screw conveyor having multiple screw sections and is connected thereto.

8. A hanger bearing assembly for a screw conveyor having multiple screw sections, comprising: an inner bearing having a plurality of inner bearing collar members, said inner bearing collar members having an arcuate inner surface, an arcuate outer surface, and an axial length; an outer bearing having a plurality of outer bearing collar members, said outer bearing collar members having an inner arcuate surface, an outer arcuate surface, and an axial length; and a bearing holder, wherein the axial length of the outer bearing collar members is greater than the axial length of the inner bearing collar members, wherein the outer bearing collar members encircle the inner bearing collar members, wherein the accurate inner surfaces of the plurality of inner bearing collar members mechanically engage an outer arcuate surface of a unity shaft, wherein the unitary shaft connects two adjacent screw sections, wherein the unitary shaft and the inner bearing are received through the outer bearing and rotate within the outer bearing, wherein there is clearance between each inner arcuate surface of the outer bearing collar members and each arcuate outer surface of the inner bearing collar members, wherein the unitary shaft includes a bore extending diametrically therethrough, wherein the plurality of inner bearing collar members mechanically engage the unitary shaft via a pin, wherein the pin passes through the bore in the unitary shaft and the bore in the plurality of inner bearing collar members, and wherein the inner bearing collar members are attached to the unitary shaft.

9. The hanger bearing assembly of claim 8 where there is no clearance between the inner arcuate surfaces of the inner bearing collar members and the outer arcuate surface of the unitary shaft.

10. The hanger bearing assembly of claim 8 where the unitary shaft has a first hardness, the inner bearing collar members have a second hardness, the outer bearing collar members have a third hardness, and the pin has a fourth hardness, and wherein the second hardness is harder than the first hardness, the third hardness is harder than the second hardness, and the fourth hardness is softer than the first hardness.

11. The hanger bearing assembly of claim 8 where the plurality of outer bearing collar members contains a plurality of radially outwardly extending arcuate flanges.

12. The hanger bearing assembly of claim 11 where the outer bearing having a plurality of outer bearing collar members contains a plurality of raised portions disposed between the plurality of arcuate flanges.

13. The hanger bearing assembly of claim 12 where the bearing holder mechanically engages the outer bearing having a plurality of outer bearing collar members via contact with the plurality of arcuate flanges, the plurality of raised portions, and the outer arcuate surfaces.

14. The hanger bearing assembly of claim 8 where the unitary shaft is inserted into at least one end of a screw section for a screw conveyor having multiple screw sections and is connected thereto.

15. The hanger bearing assembly of claim 14 where the hanger bearing assembly functions as a tail bearing assembly.

16. The hanger bearing assembly of claim 8 where the unitary shaft is inserted into at least one end of a screw section for a screw conveyor having multiple screw sections and is connected thereto and is inserted into at least one end of an adjacent screw section for a screw conveyor having multiple screw sections and is connected thereto.

17. A method for replacing a worn hanger bearing assembly installed in a screw conveyor having multiple screw sections, comprising: accessing an interior section of the screw conveyor; removing a bearing holder; removing an outer bearing; removing a pin inserted through an inner bearing and a unitary shaft connected between two adjacent screw sections; removing the inner bearing; installing a new inner bearing having a plurality of inner bearing collar members, said inner bearing collar members having an arcuate outer surface and an axial length; installing a new pin; installing a new outer bearing having a plurality of outer bearing collar members, said outer bearing collar members having an inner arcuate surface and an axial length, wherein the axial length of the outer bearing collar members is greater than the axial length of the inner bearing collar members, wherein the outer bearing collar members encircle the inner bearing collar members, and wherein there is clearance between each inner arcuate surface of the outer bearing collar members and each arcuate outer surface of the inner bearing collar members; and reattaching the bearing holder.

18. A method of retrofitting a screw conveyor having multiple screw sections with a hanger bearing assembly where none of the unitary shafts need to be replaced, comprising: accessing an interior section of the screw conveyor; removing an existing hanger bearing assembly having an original bearing and a bearing holder; boring a pin hole in a unitary shaft connected between two adjacent screw sections of the screw conveyor; installing an inner bearing having a plurality of inner bearing collar members, wherein each inner bearing collar member contains a bore hole extending therethrough, an arcuate outer surface, and an axial length; installing a pin through the bore holes in the inner bearing collar members and the unitary shaft; installing a new outer bearing having an inner arcuate surface and an axial length, said outer bearing axial length being greater than the axial length of the inner bearing collar members, and said new outer bearing being properly sized to permit the plurality of inner bearing collar members to rotate within the new outer bearing with clearance between each inner arcuate surface of the outer bearing collar members and each arcuate outer surface of the inner bearing collar members; and installing a new bearing holder properly sized to mechanically engage the new outer bearing.

19. A method of retrofitting a screw conveyor having a drive unit and multiple screw sections coupled via unitary shafts with a hanger bearing assembly where at least one unitary shaft needs to be replaced, comprising: accessing an interior section of the screw conveyor assembly; removing each existing hanger bearing assembly having an original bearing and a bearing holder; removing the drive unit from the screw conveyor assembly; removing the screw sections from the screw conveyor assembly; uncoupling the unitary shafts from the screw sections; removing the unitary shafts from the screw sections; installing unitary shafts having a pin hole extending diametrically therethrough; coupling the unitary shafts having a pin hole extending diametrically therethrough to the screw sections; installing an inner bearing having a plurality of inner bearing collar members, wherein each inner bearing collar member contains a bore hole extending therethrough, an arcuate outer surface, and an axial length; installing a pin through the bore holes in the inner bearing collar members and the unitary shaft; inserting the screw sections into the screw conveyor assembly; installing a new outer bearing having an inner arcuate surface and an axial length, said outer bearing axial length being greater than the axial length of the inner bearing collar members, and said new outer bearing being properly sized to permit the plurality of inner bearing collar members to rotate within the new outer bearing with clearance between each inner arcuate surface of the outer bearing collar members and each arcuate outer surface of the inner bearing collar members; and installing a new bearing holder properly sized to mechanically engage the new outer bearing.

20. A hanger bearing assembly for a screw conveyor having multiple screw sections, comprising: an inner bearing having a plurality of inner bearing collar members, said inner bearing collar members having an arcuate inner surface, an arcuate outer surface, and an axial length; an outer bearing having a plurality of outer bearing collar members, said outer bearing collar members having an inner arcuate surface, an outer arcuate surface, and an axial length; and a bearing holder having a plurality of arm members, said arm members having a curved portion and a generally planar elongate portion, wherein the arcuate inner surfaces of the plurality of inner bearing collar members mechanically engage an outer arcuate surface of a unitary shaft, wherein the unitary shaft connects two adjacent screw sections, where the axial length of the outer bearing collar members is greater than the axial length of the inner bearing collar members, wherein the outer bearing collar members encircle the inner bearing collar members, where the unitary shaft and the inner bearing are received through the outer bearing and rotate within the outer bearing, wherein there is clearance between each inner arcuate surface of the outer bearing collar members and each arcuate outer surface of the inner bearing collar members, and where the curved portions of the arm members mechanically engage the outer arcuate surface of the outer bearing collar members, where the unitary shaft includes a bore extending diametrically therethrough, where the plurality of inner bearing collar members mechanically engage the unitary shaft via a pin, where the pin passes through the bore in the unitary shaft and the bore in the plurality of inner bearing collar members, and where the inner bearing collar members are attached to the unitary shaft.

21. The hanger bearing assembly of claim 20 where there is no clearance between the inner arcuate surfaces of the inner bearing collar members and the outer arcuate surface of the unitary shaft.

22. The hanger bearing assembly of claim 20 where the plurality of outer bearing collar members contains a plurality of radially outwardly extending arcuate flanges.

23. The hanger bearing assembly of claim 22 where the outer bearing having a plurality of outer bearing collar members contains a plurality of raised portions disposed between the plurality of arcuate flanges.

24. The hanger bearing assembly of claim 23 where the bearing holder mechanically engages the outer bearing having a plurality of outer bearing collar members via contact with the plurality of arcuate flanges, the plurality of raised portions, and the outer arcuate surfaces.

* * * * *